US010525427B2

(12) United States Patent
Nawaz et al.

(10) Patent No.: US 10,525,427 B2
(45) Date of Patent: Jan. 7, 2020

(54) REACTOR COMPRISING RADIALLY PLACED COOLING PLATES AND METHODS OF USING SAME

(71) Applicant: SABIC Global Technologies B.V., Bergen op Zoom (NL)

(72) Inventors: Zeeshan Nawaz, Riyadh (SA); Mubarik Ali Bashir, Riyadh (SA); Khalid Karim, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/521,354

(22) PCT Filed: Oct. 29, 2015

(86) PCT No.: PCT/IB2015/058359
§ 371 (c)(1),
(2) Date: Apr. 24, 2017

(87) PCT Pub. No.: WO2016/067245
PCT Pub. Date: May 6, 2016

(65) Prior Publication Data
US 2017/0304793 A1    Oct. 26, 2017

Related U.S. Application Data

(60) Provisional application No. 62/072,778, filed on Oct. 30, 2014.

(51) Int. Cl.
*B01J 8/02* (2006.01)
*C10G 2/00* (2006.01)

(52) U.S. Cl.
CPC .......... *B01J 8/0285* (2013.01); *B01J 8/0214* (2013.01); *B01J 8/0257* (2013.01); *C10G 2/31* (2013.01);
(Continued)

(58) Field of Classification Search
CPC .. B01J 8/0214; B01J 2208/0015–00159; B01J 2208/00159
See application file for complete search history.

(56) References Cited

U.S. PATENT DOCUMENTS

| 5,405,586 A | 4/1995 | Koves |
| 6,068,760 A | 5/2000 | Benham et al. |

(Continued)

FOREIGN PATENT DOCUMENTS

| CA | 2274579 C | 6/1998 |
| CN | 102698662 A | 10/2012 |

(Continued)

OTHER PUBLICATIONS

Machine Translation for EP 0534195 A1. Retrieved from EPO website on Aug. 1, 2018. (Year: 2018).*

(Continued)

*Primary Examiner* — Jennifer A Leung
(74) *Attorney, Agent, or Firm* — Ballard Spahr LLP

(57) ABSTRACT

A reactor for hydrocarbon production that separates wax reaction products from lightweight gaseous reaction products. The reactor has a housing, a catalyst bed, a product recovery zone, and a stripping zone. The catalyst bed can be provided in multi-tubular and other fixed bed configurations. The stripping zone receives light-weight gas reaction products from the product recovery zone, while a gas outlet of the housing receives non-lightweight gaseous hydrocarbon reaction products from the product recovery zone. A wax outlet of the housing receives wax products from the product recovery zone.

13 Claims, 6 Drawing Sheets

(52) U.S. Cl.
CPC .................. *B01J 2208/0015* (2013.01); *B01J 2208/00159* (2013.01)

(56) References Cited

U.S. PATENT DOCUMENTS

| | | | |
|---|---|---|---|
| 6,590,002 | B2 | 7/2003 | Wittenbrink et al. |
| 6,846,848 | B2 | 1/2005 | Wittenbrink et al. |
| 6,946,494 | B2 * | 9/2005 | Filippi .................. B01J 8/0214 423/352 |
| 6,958,135 | B1 | 10/2005 | Filippi et al. |
| 7,204,301 | B2 * | 4/2007 | Filippi .................. B01J 8/0285 165/157 |
| 8,506,895 | B2 | 8/2013 | Wang et al. |
| 2004/0102530 | A1 | 5/2004 | Borsa et al. |

FOREIGN PATENT DOCUMENTS

| | | |
|---|---|---|
| CN | 202725143 U | 2/2013 |
| CN | PCT/IB2015/058357 | 10/2015 |
| CN | PCT/IB2015/058359 | 10/2015 |
| EP | 0534195 A1 | 3/1993 |
| EP | 1153653 A1 | 11/2001 |
| EP | 1221339 A1 | 7/2002 |
| EP | 1306126 A1 | 5/2003 |
| EP | 1216750 B1 | 8/2006 |
| EP | 1788335 A1 | 5/2007 |
| EP | PCT/IB2015/058357 | 10/2015 |
| EP | PCT/IB2015/058359 | 10/2015 |
| GC | 30278 | 10/2015 |
| GC | 30283 | 10/2015 |
| IN | 201717013920 | 10/2015 |
| IN | 201717013921 | 10/2015 |
| JP | PCT/IB2015/058357 | 10/2015 |
| JP | PCT/IB2015/058359 | 10/2015 |
| RU | PCT/IB2015/058357 | 10/2015 |
| RU | PCT/IB2015/058359 | 10/2015 |
| WO | WO-01/053430 A1 | 7/2001 |
| WO | WO-2003/006404 A1 | 1/2003 |
| WO | WO-2005/063616 A1 | 7/2005 |
| WO | PCT/IB2015/058357 | 10/2015 |
| WO | PCT/IB2015/058359 | 10/2015 |
| WO | WO-2016/067244 A1 | 5/2016 |
| WO | WO-2016/067245 A1 | 5/2016 |

OTHER PUBLICATIONS

Burtron H. Davis: "Overview of reactors for liquid phase Fischer-Tropsch synthesis" Catalysis Today. 71 (3-4): 249-300.
VanderLaan et al. "Kinetics and Selectivity of the Fischer-Tropsch Synthesis: A Literature Review" in Catal. Rev.-Sci. Eng., 41, 1999, p. 255 (Abstract).
International Search Report and Written Opinion dated Mar. 4, 2016 by the International Searching Authority for International Application No. PCT/IB2015/058359, which was filed on Oct. 29, 2015 and published as WO2016/067245 on May 6, 2016 (Applicant—Sabic Global Technologies B.V.) (17 pages).
International Search Report and Written Opinion dated Apr. 1, 2016 by the International Searching Authority for International Application No. PCT/IB2015/058357, which was filed on Oct. 29, 2015 and published as WO2016/067244 on May 6, 2016 (Applicant—Sabic Global Technologies B.V.) (11 pages).
U.S. Appl. No. 62/072,778, filed Oct. 30, 2014, Zeeshan Nawaz.
U.S. Appl. No. 62/073,331, filed Oct. 31, 2014, Zeeshan Nawaz.
U.S. Appl. No. 15/521,357, filed Apr. 24, 2017, Zeeshan Nawaz.

* cited by examiner

REACTOR COMPRISING RADIALLY PLACED COOLING PLATES AND METHODS OF USING SAME

CROSS-REFERENCE TO RELATED APPLICATIONS

This is a U.S. National Phase Application of International Application No. PCT/IB2015/058359, filed Oct. 29, 2015, which claims the benefit of U.S. Provisional Application No. 62/072,778, filed Oct. 30, 2014, which are both incorporated herein by reference in their entirety.

FIELD

This invention relates to reactors for performing chemical reactions to produce desired reaction products and, more particularly, to reactors for performing exothermic reactions (e.g., syngas conversion reactions and in-situ separation of higher and lower-weight hydrocarbon reaction products.

BACKGROUND

Reactors for conducting Fischer-Tropsch reactions and other exothermic reactions to produce a range of higher-weight reaction products, such as higher olefins, higher paraffins, and wax are well known. However, these reactors do not provide the robust control over reaction and heat constraints that are needed to perform syngas conversion reactions and other exothermic reactions that produce a range of lower-weight hydrocarbon reaction products, such as lower olefins. There is a need in the art for reactors that provide the control over reaction and heat constraints required to perform such reactions and produce and collect lower-weight reaction products.

SUMMARY

Described herein, in one aspect, is a reactor for producing a desired product. The reactor can have a housing and a plurality of coolant plates circumferentially spaced within the housing. The housing can have an outer portion, a central portion, and a longitudinal axis passing through the central portion. The outer portion of the housing can be radially spaced from the central portion. The housing can define a circumferential coolant inlet channel within the outer portion of the housing and a circumferential coolant outlet channel within the central portion of the housing. Each coolant plate of the plurality of coolant plates can extend radially between the coolant inlet channel and the coolant outlet channel. Each coolant plate can define a plurality of radial coolant channels that extend radially between and in fluid communication with the coolant inlet channel and the coolant outlet channel. The plurality of radial coolant channels can be spaced apart relative to the longitudinal axis of the housing.

In another aspect, described herein is a reactor for producing a desired product. The reactor can have a housing, a catalyst bed, and a plurality of coolant plates. The housing can have an outer wall, a first circumferential inner wall, a second circumferential inner wall, a perforated circumferential wall, and a longitudinal axis. The first circumferential inner wall can be radially spaced from the second circumferential inner wall. The perforated circumferential wall can be positioned radially between the first circumferential inner wall and the second circumferential inner wall. The outer wall and the first circumferential inner wall can cooperate to define a coolant inlet channel. The second circumferential inner wall can define a coolant outlet channel. The catalyst bed can extend circumferentially within the housing and be defined between the first circumferential inner wall and the perforated circumferential wall. The catalyst bed can be configured to receive at least one catalyst. Each coolant plate of the plurality of coolant plates can span radially across the catalyst bed between the coolant inlet channel and the coolant outlet channel. Each coolant plate can define at least one radial coolant channel positioned in fluid communication with the coolant inlet channel and the coolant outlet channel. The perforated circumferential wall of the housing can be configured to permit radial passage of the desired product, and the perforated circumferential wall can cooperate with the second circumferential inner wall to define a product collection area.

Described herein, in a further aspect, is a reactor for producing a desired product. The reactor can have a housing, a catalyst bed, and a plurality of coolant plates. The housing can have an outer wall, a first circumferential inner wall, a second circumferential inner wall, a first perforated circumferential wall, a second perforated circumferential wall, and a longitudinal axis. The first inner wall can be radially spaced from the second inner wall. The first perforated circumferential wall can be positioned radially between the first circumferential inner wall and the second circumferential inner wall. The second perforated circumferential wall can be positioned radially between the first perforated circumferential wall and the second circumferential inner wall. The outer wall and the first circumferential inner wall can cooperate to define a coolant inlet channel. The second inner wall can define a coolant outlet channel. The catalyst bed can extend circumferentially within the housing and be defined between the first perforated circumferential wall and the second perforated circumferential wall. The catalyst bed can be configured to receive at least one catalyst. Each coolant plate of the plurality of coolant plates can span radially across the catalyst bed between the coolant inlet channel and the coolant outlet channel. Each coolant plate can define at least one radial coolant channel. The first perforated circumferential wall can cooperate with the first circumferential inner wall to define a gas inlet channel. The gas inlet channel can be configured to receive at least one gas. The first perforated circumferential wall can be configured to permit radial passage of the at least one gas into the catalyst bed. The second perforated circumferential wall can cooperate with the second circumferential inner wall to define a product collection area. The second perforated circumferential wall of the housing can be configured to permit radial passage of the desired product into the product collection area.

Methods of using the described reactors to perform a chemical reaction are also disclosed. In exemplary aspects, the described reactors can be used to perform a syngas conversion reaction.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE FIGURES

These and other features of the preferred embodiments of the invention will become more apparent in the detailed description in which reference is made to the appended drawings wherein.

Figure 3:
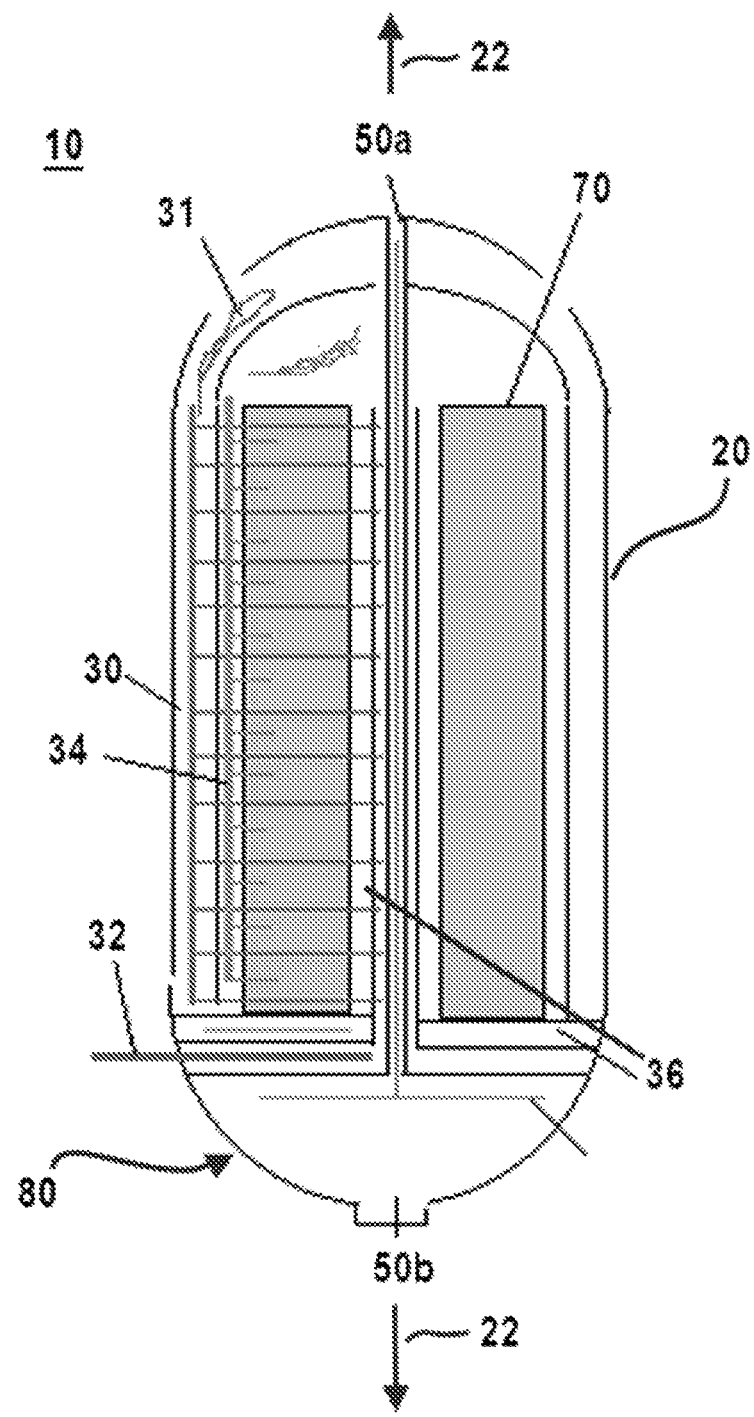

FIG. 3 is a top cross-sectional view of an exemplary reactor as disclosed herein. As shown, each coolant plate extends from a coolant inlet to a coolant outlet, a first perforated wall permits the flow of gas into a catalyst bed, and a second perforated wall permits the flow of a desired product into a product collection zone. A product stripping zone is provided in a center portion of the reactor to collect reaction products and permit separation of higher-weight and lower-weight reaction products.

Figure 4:
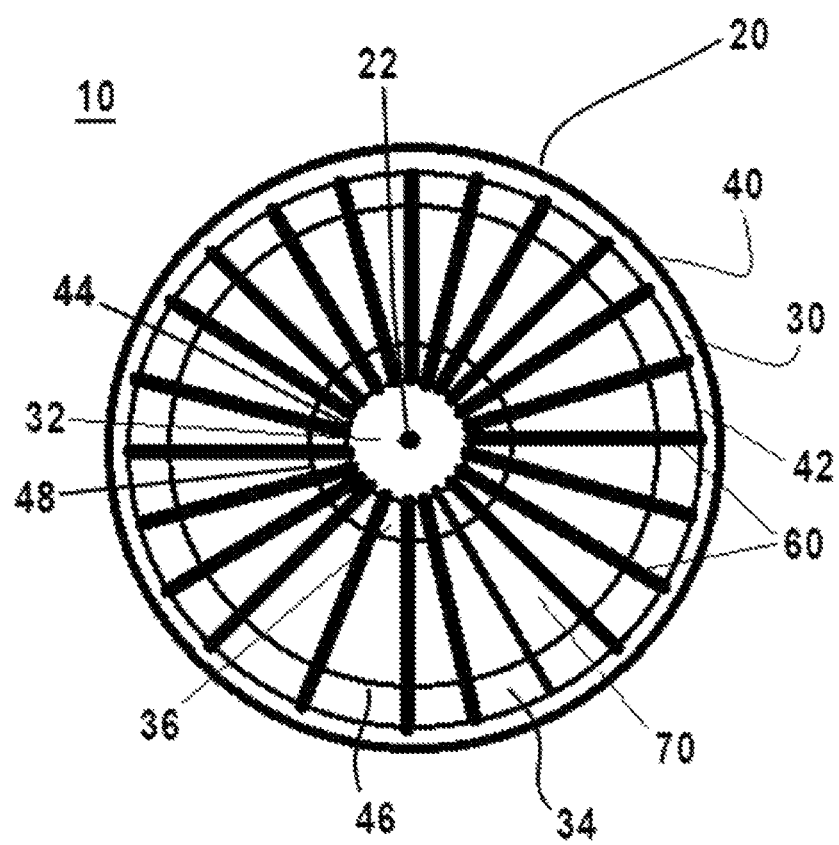

FIG. 4 is a side cross-sectional view of an exemplary reactor as disclosed herein. As shown, the housing of the reactor has a base portion that is in communication with a product collection zone and that defines a first product outlet to receive heavier reaction products. A second product outlet extends upwardly and away from the base portion relative to the longitudinal axis of the reactor to permit recovery of lighter reaction products by stripping.

Figure 5:
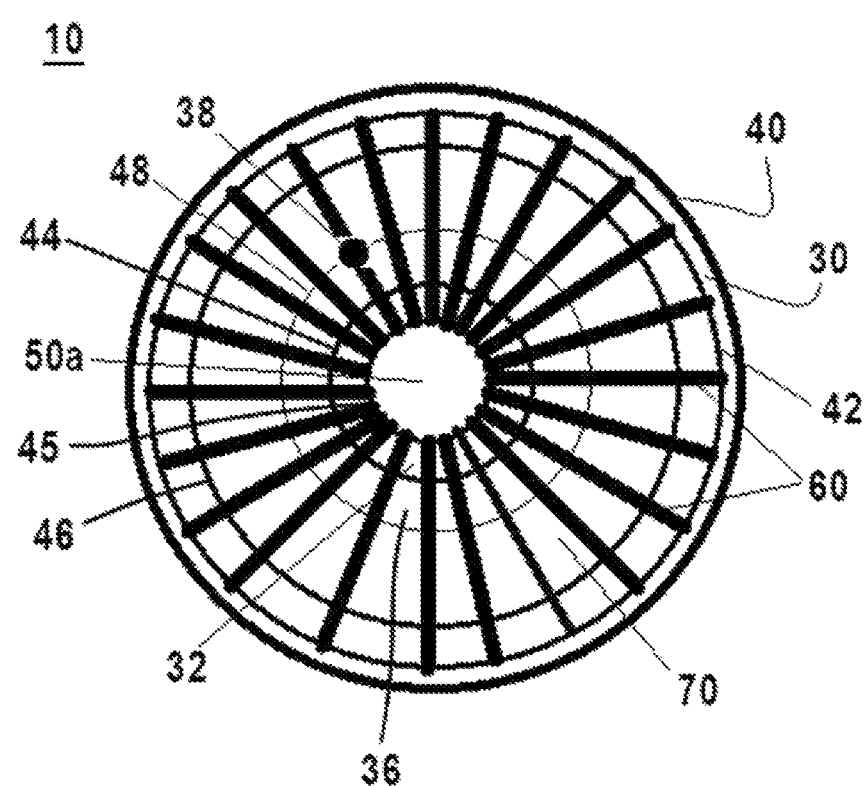

FIG. 5 is a top cross-sectional view of the reactor of FIG. 4. As shown, additional (secondary) coolant injection points can be radially spaced from the coolant inlet channel to meet coolant flow requirements.

Figure 6:
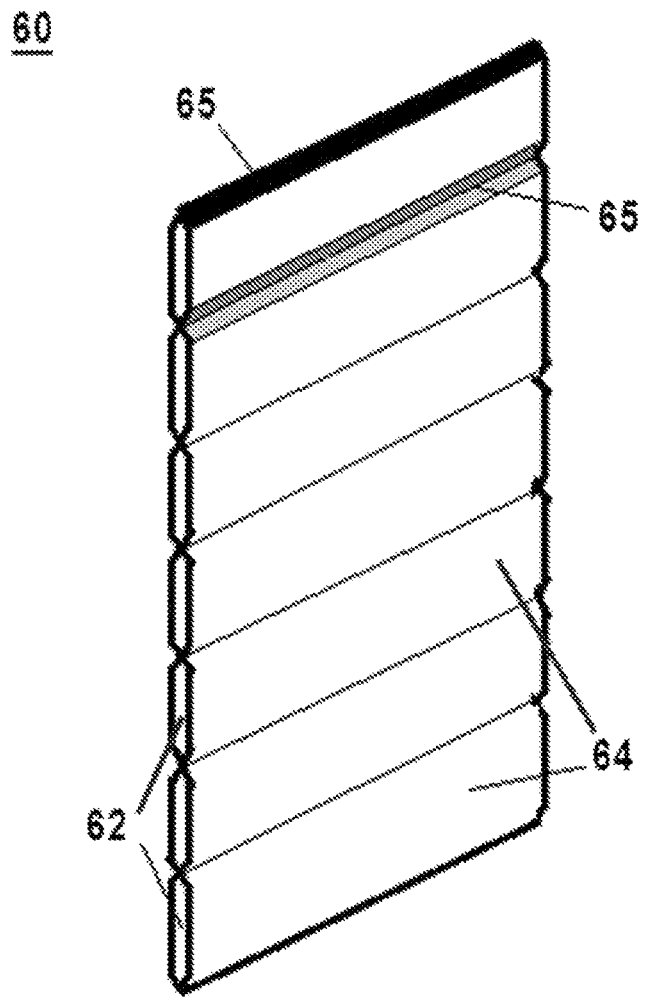

FIG. 6 is an isolated perspective view of an exemplary coolant plate for use in a reactor as disclosed herein.

DETAILED DESCRIPTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

As used throughout, the singular forms "a," "an" and "the" include plural referents unless the context clearly dictates otherwise. Thus, for example, reference to "a product outlet" can include two or more such product outlets unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

The Reactor

Described herein with reference to FIGS. 1-6 is a reactor 10 for producing a desired product. In exemplary aspects, the reactor 10 can comprise a housing 20 and a plurality of coolant plates 60.

In one aspect, the housing 20 of the reactor can have an outer portion 24, a central portion 26, and a longitudinal axis 22 passing through the central portion. In this aspect, the outer portion 24 can be radially spaced from the central portion 26. As used herein, the terms "radial" or "radially" refer to a placement or orientation of an item relative to a transverse plane that is substantially perpendicular to the longitudinal axis 22 of a reactor as disclosed herein. Thus, when a first element of a reactor is radially spaced from a second element of the reactor, aligned portions of the first and second elements are spaced apart relative to a transverse axis 28 that positioned within the transverse plane and is therefore substantially perpendicular to the longitudinal axis of the reactor. Similarly, when a substance moves or flows in a radial direction, the movement or flow occurs relative to a transverse axis 28 that is positioned within the transverse plane and is therefore substantially perpendicular to the longitudinal axis of the reactor. It is understood that such radial flow can occur in a direction that is generally toward the longitudinal axis of the reactor (radially inwardly) or in a direction that is generally away from the longitudinal axis of the reactor (radially outwardly).

In exemplary aspects, the housing 20 can define a circumferential coolant inlet channel 30 within the outer portion 24 of the housing and a circumferential coolant outlet channel 32 within the central portion of the housing. In these aspects, it is contemplated that the housing 20 can define at least one opening 31 positioned in fluid communication with the coolant inlet channel 30 to permit delivery of one or more coolant materials to the coolant inlet channel. In exemplary aspects, the at least one opening 31 can be defined in the outer portion 24 of the housing 20. In further exemplary aspects, the at least one opening 31 can comprise at least first and second openings that are spaced relative to the longitudinal axis 22 of the housing 20. In these aspects, it is contemplated that the one or more coolant materials can be configured to flow from the first opening to the second opening or, alternatively, from the second opening to the first opening, thereby allowing for selective changing of the direction of coolant flow within the coolant inlet channel 30.

In another aspect, the plurality of coolant plates 60 of the reactor 10 can be circumferentially spaced within the housing 20. In this aspect, each coolant plate 60 of the plurality of coolant plates can extend radially between the coolant inlet channel 30 and the coolant outlet channel 32. In an additional aspect, and with reference to FIG. 6, each coolant plate 60 can define at least one radial coolant channel extending radially between, and in fluid communication with, the coolant inlet channel 30 and the coolant outlet channel 32. Thus, in use, it is contemplated that the coolant inlet channel 30 can be configured to permit axial flow of coolant relative to the longitudinal axis 22 of the housing while the plurality of coolant plates 60 can be configured to permit radial flow of coolant within the reactor. It is contemplated that axial and radial coolant flow within the reactor can be selectively adjusted by varying the configuration and/or dimensions of the plurality of coolant plates 60 and the coolant inlet channel 30. Optionally, in another aspect, the at least one radial coolant channel can comprise a plurality of radial coolant channels. In this aspect, it is contemplated that the plurality of radial coolant channels 62 can be spaced apart relative to the longitudinal axis 22 of the housing 20. Optionally, in exemplary aspects, each coolant plate 60 can comprise a plurality of adjoined plate segments 64, and each plate segment can define a corresponding radial coolant channel 62. In these aspects, each respective plate segment 64 of each coolant plate 60 can be welded to its adjoining plate segments. Exemplary non-limiting welding locations 65 are shown in FIG. 6. As shown in FIGS. 3 and 5, in exemplary, optional aspects, the plurality of coolant plates 60 can be substantially evenly circumferentially spaced within the housing 20.

Optionally, in exemplary aspects, it is contemplated that the plurality of coolant plates 60 can comprise a first group of plates circumferentially spaced relative to an inner circle and at least one additional group of plates circumferentially spaced relative to corresponding outer circles (that surround the inner circle), wherein the first group of plates cooperates with the additional groups of plates to permit flow of coolant as disclosed herein. As one will appreciate, the size and number of coolant plates 60 can be selected depending upon the particular chemical reaction that is performed.

In a further aspect, and with reference to FIGS. 1-5, the reactor 10 can further comprise a catalyst bed 70 extending axially and circumferentially within the housing 20. In this aspect, the catalyst bed 70 can be defined between the coolant inlet channel 30 and the coolant outlet channel 32. It is contemplated that the catalyst bed 70 can be configured to receive at least one catalyst.

Figure 1:
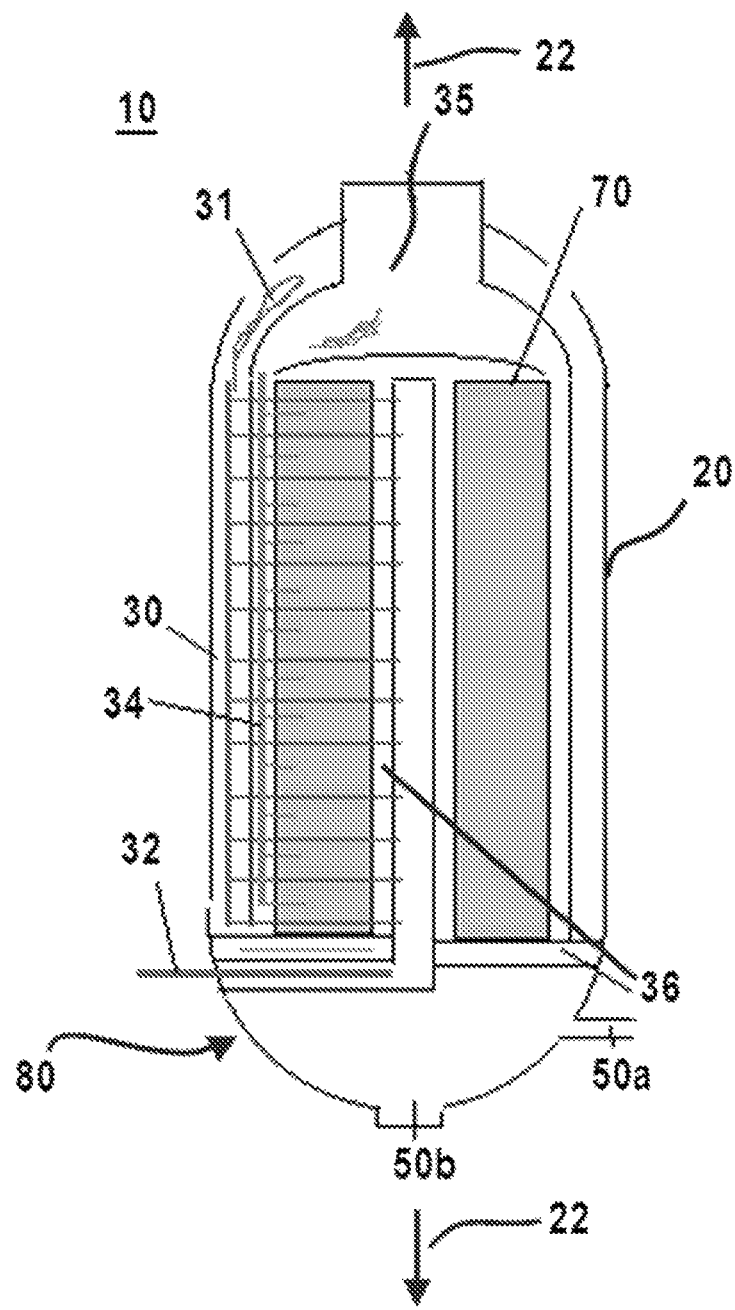
FIG. 1 is a front cross-sectional view of an exemplary reactor as disclosed herein. As shown, the housing of the reactor has a base portion that is in communication with a product collection zone and that defines first and second product outlets to permit separate recovery of light reaction products.

In an additional aspect, the housing can define a gas inlet 34 positioned in fluid communication with the catalyst bed 70. In this aspect, the gas inlet 34 can be configured to deliver gas to the catalyst bed 70. In exemplary aspects, the gas inlet 34 can be configured to permit radial flow of gas into the catalyst bed 70. In further exemplary aspects, the plurality of coolant plates 60 can span radially across the catalyst bed 70. In these aspects, upon delivery of the gas into the gas inlet 34, the gas travels into the catalyst bed 70, and the plurality of coolant plates 60 can be configured to provide cooling to the catalyst bed during the reaction between the gas and the catalyst within the catalyst bed. In exemplary aspects, it is contemplated that the housing 20 can define at least one opening 35 positioned in fluid communication with the gas inlet 34 to permit delivery of one or more gaseous materials to the gas inlet. Optionally, in these aspects, the at least one opening 35 can comprise a circumferential opening defined within a top portion of the housing 20 such that the longitudinal axis 22 of the housing passes through a center point of the opening. In exemplary aspects, as shown in FIG. 1, the reactor 10 can comprise interior structures that isolate the at least one opening 35 and the gas inlet 34 from the at least one opening 31 and the coolant inlet channel 30.

In yet another aspect, the housing 20 can define a product collection area 36 in fluid communication with the catalyst bed 70. In this aspect, the product collection area 36 can be configured to receive the desired product following reaction between the gas and the at least one catalyst within the catalyst bed 70.

In a further aspect, the housing 20 can define one or more product outlets 50 positioned in fluid communication with the product collection area 36. Optionally, in exemplary aspects, and with reference to FIGS. 1 and 4, the one or more product outlets can comprise a first product outlet 50a and a second product outlet 50b. In these aspects, it is contemplated that the first product outlet 50a can be configured to receive light-weight products from the product collection area 36. It is further contemplated that the second product outlet 50b can be configured to receive heavier products from the product collection area 36.

In still another aspect, the reactor 10 can further comprise at least one secondary coolant inlet 38 spaced radially inwardly from the coolant inlet channel 30 (and the at least one opening 31). In this aspect, each secondary coolant inlet 38 can be positioned in fluid communication with at least one coolant plate 60 of the plurality of coolant plates. In operation, it is contemplated that the secondary coolant inlets 38 can be configured to enhance the efficiency of coolant flow within the reactor 10. Optionally, in exemplary aspects, it is contemplated that the opening 31 and the at least one secondary coolant inlet 38 can be defined in a top portion of the reactor or a bottom portion of the reactor, depending upon the desired direction of coolant flow relative to the longitudinal axis 22 of the housing.

Figure 2:
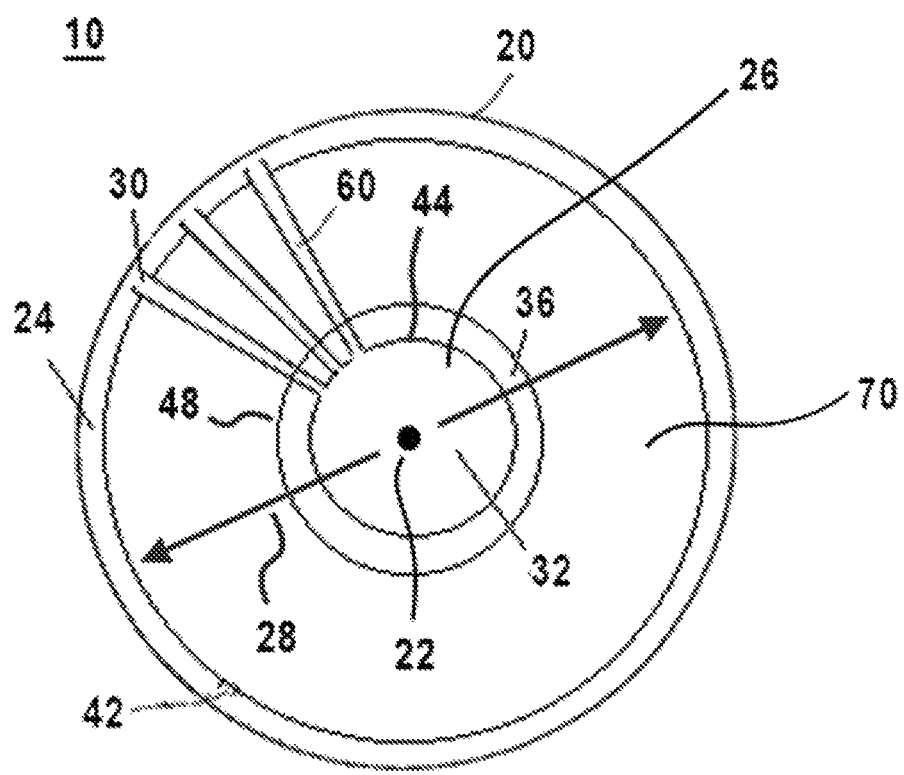
FIG. 2 is a top cross-sectional view of the reactor of FIG. 1. As shown, each coolant plate extends from a coolant inlet to a coolant outlet, and a circumferential perforated wall cooperates with an inner wall to define a product collection zone.

Optionally, in exemplary aspects, and with reference to FIG. 2, the housing 20 can have an outer wall 40, a first circumferential inner wall 42, a second circumferential inner wall 44, and a perforated circumferential wall 48. In these aspects, the first circumferential inner wall 42 can be radially spaced from the second circumferential inner wall 44. As shown in FIG. 2, the perforated circumferential wall 48 can be positioned radially between the first circumferential inner wall 42 and the second circumferential inner wall 44. In exemplary aspects, the outer wall 40 and the first circumferential inner wall 42 can cooperate to define the coolant inlet channel 30. In other exemplary aspects, the second circumferential inner wall 44 can define the coolant outlet channel 32. In further exemplary aspects, it is contemplated that the catalyst bed 70 can be defined between the first circumferential inner wall 42 and the perforated circumferential wall 48. In operation, it is contemplated that the perforated circumferential wall 48 of the housing 20 can be configured to permit radial passage of the desired product. It is further contemplated that the perforated circumferential wall 48 can cooperate with adjoining portions of the housing to permit axial passage of the desired product relative to the longitudinal axis 22 of the reactor. In exemplary aspects, it is further contemplated that the perforated circumferential wall 46 can cooperate with the second circumferential inner wall 44 to define the product collection area 36.

Optionally, in other exemplary aspects, and with reference to FIGS. 1 and 3-5, the housing can further comprise first and second perforated circumferential walls 46, 48. In these aspects, the first perforated circumferential wall 46 can be positioned radially between the first circumferential inner wall 42 and the second circumferential inner wall 44, and the second perforated circumferential wall 48 can be positioned radially between the first perforated circumferential wall 46 and the second circumferential inner wall 44. In these aspects, it is further contemplated that the catalyst bed 70 can be defined between the first perforated circumferential wall 46 and the second perforated circumferential wall 48. In exemplary aspects, the first perforated circumferential wall 46 can cooperate with the first circumferential inner wall to define the gas inlet 34, which can optionally be a gas inlet channel. In operation, the first perforated circumferential wall 46 can be configured to permit radial passage of the at least one gas into the catalyst bed. It is contemplated that the second perforated circumferential wall 48 can cooperate with the second circumferential inner wall 44 to define the product collection area 36. It is further contemplated that the second perforated circumferential wall 48 of the housing 20 can be configured to permit radial passage of the desired product into the product collection area 36.

Optionally, in further exemplary aspects, and with reference to FIGS. 3-5, the housing 20 can define a base portion 80 positioned in fluid communication with the product collection area 36 and the first and second product outlets 50*a*, 50*b*. In these aspects, it is contemplated that the base portion 80 of the housing 20 can define the second product outlet 50*b*. It is further contemplated that the second product outlet 50*b* can cooperate with other portions of the base portion 80 of the housing 20 to define a stripping zone to permit light gas tripping from wax and other higher-weight reaction products (heavies). In another exemplary aspect, the first product outlet 50*a* can be defined by a third circumferential inner wall 45 positioned within and radially spaced from the second inner wall 44 of the housing 20. In this aspect, as shown in FIG. 4, the first product outlet 50*a*, can extend upwardly from the base portion 80 of the housing 20.

As described above, in operation, it is contemplated that coolant can radially flow from the coolant inlet channel 30 to the coolant outlet channel 32. Concurrently, gas reactants can radially flow from the gas inlet 34 through the catalyst bed 70. In exemplary aspects, when water is used as the coolant, it is contemplated that the coolant outlet channel 32 can collect steam resulting from the higher temperatures in the catalyst bed 70 that surround the coolant plates 60. In further exemplary aspects, and with reference to FIGS. 1 and 3, as the gas outlet channel 32 approaches the base portion 80 of the housing 20, the gas outlet channel can extend radially outwardly through the housing, thereby providing communication between the gas outlet channel and the exterior of the housing. Following the reaction between the gas and the catalyst within the catalyst bed 70, reaction products radially flow into the product collection area 36. As the reaction products enter the product collection area 36, they can flow downwardly toward the base portion 80 of the housing 20. As the reaction products collect within the base portion 80, lower-weight reaction products can separate from higher-weight reaction products, with the lower-weight reaction products flowing toward the first product outlet 50*a* and the higher-weight reaction products flowing toward the second product outlet 50*b*. Thus, it is contemplated that this arrangement can permit isolation and collection of the lower-weight reaction products and higher-weight reaction products resulting from the chemical reaction within the reactor 10.

In exemplary aspects, although labeled as the coolant inlet channel and the coolant outlet channel, respectively, it is contemplated that the orientation of the coolant inlet channel and the coolant outlet channel can be reversed such that element 30 corresponds to the coolant outlet channel and element 32 corresponds to the coolant inlet channel. Similarly, it is contemplated that the orientation of the gas inlet 34 and the product collection area 36 can be reversed such that element 34 corresponds to the product collection area and element 36 corresponds to the gas inlet. Thus, it is contemplated that flow of both coolant and gas can be selectively varied such that the coolant and gas both flow in a first radial direction, the coolant and gas both flow in a second radial direction opposite the first radial direction, the coolant flows in the first radial direction while the gas flows in the second radial direction, or the coolant flows in the second radial direction while the gas flows in the first radial direction. In various exemplary aspects, it is contemplated that the location of the other elements of the reactor 10, including, for example and without limitation, the walls, the perforated walls, the gas inlet 34, and the product collection area 60, can be modified as needed depending on the axial and radial directions of coolant and/or gas flow within the reactor. Optionally, in exemplary aspects, it is contemplated that the radial spacing of the walls and perforated walls within the reactor can be selectively adjustable.

Methods of Using the Reactor

In use, the disclosed reactors can be used to produce a desired product. In one aspect, a method for producing the desired product can comprise performing a chemical reaction using the reactor. In exemplary aspects, the chemical reaction can be a syngas conversion reaction. Optionally, in these aspects, it is contemplated that the syngas conversion reaction can be a Fischer-Tropsch reaction.

In further aspects, the method for producing the desired product can comprise positioning at least one catalyst within the catalyst bed of the reactor. The method can further comprise selectively delivering at least one coolant to the coolant inlet channel. The method can further comprise selectively delivering at least one gaseous material to the gas inlet. In exemplary aspects, the method can further comprise collecting at least one reaction product. Optionally, in these aspects, the step of collecting at least one reaction product can comprise collecting lower-weight reaction products from the first product outlet and collecting higher-weight reaction products from the second product outlet. Optionally, the method can further comprise collecting steam or other materials from the coolant outlet channel.

As used herein, the term "lower-weight reaction product" refers to C9 and lower hydrocarbons, and the term "higher-weight reaction product" refers to C10 and higher hydrocarbons. Higher-weight reaction products of C26 and greater are generally referred to herein as "wax" or "wax reaction products." It is contemplated that stripping as disclosed herein and/or flash distillation can be used to separate higher-weight reaction products from lower-weight reaction products.

In exemplary aspects, the at least one catalyst can be any conventional catalyst that is suitable for the chemical reaction. In additional exemplary aspects, it is contemplated that the reaction can be a gas-solid exothermic reaction or an endothermic reaction.

In exemplary aspects, the at least one catalyst can comprise at least one Co-based carbon monoxide (CO) conversion catalyst as is known in the art. In other exemplary aspects, it is contemplated that the at least one catalyst can comprise at least one Fe-based CO conversion catalyst as is known in the art. However, it is contemplated that any conventional catalyst for producing a desired reaction product can be used. It is further contemplated that any suitable metal promoter as is known in the art can be used with the at least one catalyst.

In exemplary aspects, the at least one coolant can comprise one or more of boiler feed water (BFW), steam, molten salt, synthetic heat transfer media, mineral oils, organic heat transfer media, aqueous or inorganic or organic brine, molten metals, gases, and the like. However, it is contemplated that the at least one coolant can comprise any material that is conventionally used to provide cooling or heating to a catalyzed reaction, such as, for example and without limitation, a Fischer-Tropsch reaction.

In exemplary aspects, the at least one gaseous material delivered to the gas inlet can comprise a syngas. In these aspects, it is contemplated that the syngas can be formed by contacting a natural gas with steam (and, optionally, carbon dioxide) to produce the syngas using a known reforming process, such as Steam Methane Reforming (SMR), Auto Thermal Reforming (ATR), Partial Oxidation, Adiabatic Pre Reforming (APR), or Gas Heated Reforming (GHR) or any appropriate combination. In further exemplary aspects, the syngas can comprise carbon monoxide, carbon dioxide, or hydrogen, or a combination thereof. In another aspect, the syngas can comprise carbon monoxide and hydrogen. In an additional aspect, it is contemplated that the feed syngas can optionally comprise recycling product components, metallic impurities, sulfur, sulfides, chlorides, organic and/or inorganic acids, water, and the like.

In exemplary aspects, the syngas can be converted into the at least one reaction product by a catalytic process which is usually referred to as the Fischer-Tropsch (FT) process. This is for example described by Van der Laan et al. in Catal. Rev.-Sci. Eng., 41, 1999, p. 255, which is incorporated herein by reference in its entirety. In these aspects, it is contemplated that the at least one reaction product can comprise hydrocarbons. It is further contemplated that the at least one reaction product can comprise at least one olefin, carbon dioxide, and hydrogen. In further exemplary aspects, in addition to the at least one olefin, the at least one reaction product can comprise water, one or more alcohols, or one or more hydrocarbons.

In one aspect, the olefin of the at least one reaction product can comprise C2-C10 hydrocarbons. In another aspect, the olefin can comprise carbons ranging from two carbons to ten carbons, including 3, 4, 5, 6, 7, 8, or 9 carbons. In one aspect, the range of carbon atoms can be derived from any two preceding values. For example, the olefin can comprise carbons ranging from three carbons to nine carbons. In another aspect, the olefin can comprise at least one double bond. In another aspect, the olefin can comprise two double bonds. In a further aspect, the olefin can comprise three double bonds. In still another aspect, the olefin can comprise ethylene, propene, 1-butene, 1-pentene, 1-heptene, 1-hexene, 2-ethyl-hexylene, 2-ethyl-heptene, 1-octene, 1-nonene, or 1-decene, or a combination thereof.

In an additional aspect, the olefin can comprise multiple double bonds. In this aspect, the olefin can be a diolefin. In a further aspect, the olefin can be 1,3-butadiene, 1,4-pentadiene, heptadiene, or a combination thereof. In a further aspect, the olefin can be a cyclic olefin and diolefin. In still another aspect, the olefin can be cyclopentene, cyclopentadiene, cyclohexene, cyclohexadiene, or methyl cyclopentadiene and the like; or a cyclic diolefindiene, e.g., dicyclopentadiene, methylcyclopentadiene dimer and the like.

In further exemplary aspects, the at least one reaction product can comprise one or more paraffins, one or more alcohols, water, or carbon dioxide, or a mixture thereof. In a further aspect, the paraffin can comprise a light paraffin or a heavy paraffin, or a combination thereof. In one aspect, the heavy paraffin can comprise an alkane with 10 or more carbons (C10 and greater). Thus, in this aspect, the heavy paraffin can be a higher-weight reaction product as described herein. In another aspect, the light paraffin can comprise an alkane with 9 or fewer carbons (C9 or less). Thus, in this aspect, the light paraffin can be a lower-weight reaction product as described herein. Heavy paraffin reaction products of C26 and greater can be a wax as described herein.

Optionally, in various aspects, the disclosed system, apparatus, and methods can be operated or performed on an industrial scale. In one aspect, the system, apparatus, and methods disclosed herein can be configured to produce the disclosed reaction products on an industrial scale. For example, according to further aspects, the system, apparatus, and methods can produce batches of one or more of the disclosed reaction products on an industrial scale. In a further aspect, the batch size can comprise any desired industrial-scale batch size. It is contemplated that the batch capacity of the reactor can vary due to vessel size and the amount of loaded catalyst. The reactor capacity can also be related to catalyst activity, type of catalyst, and the choice of reactor. In exemplary aspects, catalyst volume per reactor and feed flow rate can vary from about 0.1 $m^3$ to about 500 $m^3$.

In various aspects, the disclosed system, apparatus, and methods can be operated or performed on any desired time scale or production schedule that is commercially practicable. It is contemplated that the reactor can be configured for continuous, semi batch, or batch wise operation. The residence time and/or weight hourly space velocity (WHSV)

can vary depending upon the choice and performance of catalyst and the nature of the chemical reaction. Similarly, the production rate of desired product can also vary. In exemplary syngas conversion reactions, WHSV and residence time can respectively vary between about 100 and about 10,000 Nl/kg/hr and from about 1 to about 50 seconds. In these aspects, the productivity of such a syngas conversion reaction for hydrocarbons can vary between about 0.01 and about 1 kg/kg of Catalyst/hr. However, it is contemplated that the productivity of the reaction can vary further depending upon the choice and performance of catalyst.

In additional aspects, the components of the disclosed system and apparatus can be shaped and sized to permit production of the disclosed reaction products on an industrial scale. Similarly, it is contemplated that the components of the disclosed system and apparatus can comprise materials having material properties that are configured to permit production of the disclosed reaction products on an industrial scale. In further aspects, the components of the disclosed system and apparatus can be shaped and sized to produce the desired reaction products in accordance with the desired time scale or production schedule. In these aspects, it is understood that the distance between coolant plates, the size of coolant plates, the angle of placement of the coolant plates, and the circumferential placement of coolant plates can be determined depending upon the size of the vessel and the nature of reaction or the productivity of the reaction. Similarly, it is contemplated that the components of the disclosed system and apparatus can comprise materials having material properties that are configured to permit production of the disclosed reaction products in accordance with the desired time scale or production schedule.

In further exemplary aspects, it is contemplated that the components of the disclosed system and apparatus can comprise any conventional materials that are capable of receiving, housing, and/or contacting reactants, coolants, products, and the like as disclosed herein.

Aspects

Aspect 1: A reactor for producing a desired product, comprising: a housing having an outer portion, a central portion, and a longitudinal axis passing through the central portion, the outer portion being radially spaced from the central portion, the housing defining a circumferential coolant inlet channel within the outer portion of the housing and a circumferential coolant outlet channel within the central portion of the housing, the coolant inlet channel being configured to receive at least one coolant material; and a plurality of coolant plates circumferentially spaced within the housing, wherein each coolant plate of the plurality of coolant plates extends radially between the coolant inlet channel and the coolant outlet channel, wherein each coolant plate defines a plurality of radial coolant channels that extend radially between, and in fluid communication with, the coolant inlet channel and the coolant outlet channel, and wherein the plurality of radial coolant channels are spaced apart relative to the longitudinal axis of the housing.

Aspect 2: The reactor of aspect 1, wherein each coolant plate comprises a plurality of adjoined plate segments, and wherein each plate segment defines a corresponding radial coolant channel.

Aspect 3: The reactor of any one of the preceding aspects, wherein each respective plate segment of each coolant plate is welded to its adjoining plate segments.

Aspect 4: The reactor of any one of the preceding aspects, further comprising a catalyst bed extending circumferentially within the housing and defined between the coolant inlet channel and the coolant outlet channel, the catalyst bed being configured to receive at least one catalyst, wherein the plurality of coolant plates span radially across the catalyst bed.

Aspect 5: The reactor of aspect 4, wherein the housing defines a gas inlet positioned in fluid communication with the catalyst bed, the gas inlet being configured to deliver reactant gas to the catalyst bed.

Aspect 6: The reactor of aspect 5, wherein the gas inlet is configured to permit radial flow of gas into the catalyst bed.

Aspect 7: The reactor of any one of aspects 5-6, wherein the housing defines a product collection area in fluid communication with the catalyst bed, wherein the product collection area is configured to receive the desired product following reaction between the gas and the at least one catalyst within the catalyst bed.

Aspect 8: The reactor of any one of the preceding aspects, wherein the plurality of coolant plates are substantially evenly circumferentially spaced within the housing.

Aspect 9: The reactor of any one of the preceding aspects, further comprising at least one secondary coolant inlet spaced radially inwardly from the coolant inlet channel, each secondary coolant inlet being positioned in fluid communication with at least one coolant plate of the plurality of coolant plates.

Aspect 10: A method of producing a desired product, comprising performing a chemical reaction using the reactor of any one of the preceding aspects.

Aspect 11: The method of aspect 10, wherein the chemical reaction is an exothermic reaction.

Aspect 12: The method of aspect 11, wherein the exothermic reaction is a syngas conversion reaction.

Aspect 13: The method of aspect 10, wherein the chemical reaction is an endothermic reaction.

Aspect 14: A reactor for producing a desired product, comprising: a housing having an outer wall, a first circumferential inner wall, a second circumferential inner wall, a perforated circumferential wall, and a longitudinal axis, the first circumferential inner wall being radially spaced from the second circumferential inner wall, the perforated circumferential wall being positioned radially between the first circumferential inner wall and the second circumferential inner wall, the outer wall and the first circumferential inner wall cooperating to define a coolant inlet channel, the coolant inlet channel being configured to receive at least one coolant material, the second circumferential inner wall defining a coolant outlet channel; a catalyst bed extending circumferentially within the housing and defined between the first circumferential inner wall and the perforated circumferential wall, the catalyst bed being configured to receive at least one catalyst; and a plurality of coolant plates, each coolant plate of the plurality of coolant plates spanning radially across the catalyst bed between the coolant inlet channel and the coolant outlet channel, each coolant plate defining at least one radial coolant channel positioned in fluid communication with the coolant inlet channel and the coolant outlet channel, wherein the perforated circumferential wall of the housing is configured to permit radial (and, optionally, axial) passage of the desired product, and wherein the perforated circumferential wall cooperates with the second circumferential inner wall to define a product collection area.

Aspect 15: The reactor of aspect 14, wherein the housing defines a gas inlet positioned in fluid communication with the catalyst bed, the gas inlet configured to deliver gas to the catalyst bed.

Aspect 16: The reactor of aspect 15, wherein the gas inlet is configured to permit radial flow of gas into the catalyst bed.

Aspect 17: The reactor of any one of aspects 15-16, wherein the plurality of coolant plates are configured to provide cooling to the catalyst bed during the reaction between the gas and the catalyst within the catalyst bed.

Aspect 18: The reactor of any one of aspects 14-17, wherein the housing defines one or more product outlets, and wherein the product collection area is positioned in communication with the one or more product outlets.

Aspect 19: The reactor of aspect 18, wherein the one or more product outlets comprises a first product outlet and a second product outlet, wherein the first product outlet is configured to receive light-weight products from the product collection area, and wherein the second product outlet is configured to receive heavier products from the product collection area.

Aspect 20: The reactor of any one of aspects 14-19, wherein the at least one radial coolant channel of each coolant plate comprises a plurality of radial coolant channels.

Aspect 21: The reactor of any one of aspects 14-20, wherein the plurality of coolant plates are substantially evenly circumferentially spaced within the housing.

Aspect 22: The reactor of any one of aspects 14-21, further comprising at least one secondary coolant inlet spaced radially inwardly from the coolant inlet channel, each secondary coolant inlet being positioned in fluid communication with at least one coolant plate of the plurality of coolant plates.

Aspect 23: A method of producing a desired product, comprising performing a chemical reaction using the reactor of any one of aspects 14-22.

Aspect 24: The method of aspect 23, wherein the chemical reaction is an exothermic reaction.

Aspect 25: The method of aspect 24, wherein the exothermic reaction is a syngas conversion reaction.

Aspect 26: The method of aspect 23, wherein the chemical reaction is an endothermic reaction.

Aspect 27: A reactor for producing a desired product, comprising: a housing having an outer wall, a first circumferential inner wall, a second circumferential inner wall, a first perforated circumferential wall, a second perforated circumferential wall, and a longitudinal axis, the first inner wall being radially spaced from the second inner wall, the first perforated circumferential wall being positioned radially between the first circumferential inner wall and the second circumferential inner wall, the second perforated circumferential wall being positioned radially between the first perforated circumferential wall and the second circumferential inner wall, the outer wall and the first circumferential inner wall cooperating to define a coolant inlet channel, the coolant inlet channel being configured to receive at least one coolant material, the second inner wall defining a coolant outlet channel; a catalyst bed extending circumferentially within the housing and defined between the first perforated circumferential wall and the second perforated circumferential wall, the catalyst bed being configured to receive at least one catalyst; and a plurality of coolant plates, each coolant plate of the plurality of coolant plates spanning radially across the catalyst bed between the coolant inlet channel and the coolant outlet channel, each coolant plate defining at least one radial coolant channel, wherein the first perforated circumferential wall cooperates with the first circumferential inner wall to define a gas inlet channel, the gas inlet channel being configured to receive at least one gas, wherein the first perforated circumferential wall is configured to permit radial passage of the at least one gas into the catalyst bed, wherein the second perforated circumferential wall cooperates with the second circumferential inner wall to define a product collection area, and wherein the second perforated circumferential wall of the housing is configured to permit radial passage of the desired product into the product collection area.

Aspect 28: The reactor of aspect 27, wherein upon delivery of the gas into the gas inlet channel, the catalyst bed is configured to receive the gas from the gas inlet channel, and wherein the plurality of coolant plates are configured to provide cooling to the catalyst bed during the reaction between the gas and the catalyst within the catalyst bed.

Aspect 29: The reactor of any one of aspects 27-28, wherein the product collection area is positioned in communication with one or more product outlets.

Aspect 30: The reactor of aspect 29, wherein the one or more product outlets comprises a first product outlet and a second product outlet, wherein the first product outlet is configured to receive light-weight products from the product collection area, and wherein the second product outlet is configured to receive heavier products from the product collection area.

Aspect 31: The reactor of aspect 30, wherein the housing defines a base portion positioned in fluid communication with the product collection area and the first and second product outlets, wherein the base portion of the housing defines the second product outlet.

Aspect 32: The reactor of aspect 31, wherein the first product outlet is defined by a third inner wall positioned within and radially spaced from the second inner wall of the housing, and wherein the first product outlet extends upwardly from the base portion of the housing.

Aspect 33: The reactor of any one of aspects 27-32, wherein the at least one radial coolant channel of each coolant plate comprises a plurality of radial coolant channels.

Aspect 34: The reactor of any one of aspects 27-33, wherein the plurality of coolant plates are substantially evenly circumferentially spaced within the housing.

Aspect 35: The reactor of any one of aspects 27-34, further comprising at least one secondary coolant inlet spaced radially inwardly from the coolant inlet channel, each secondary coolant inlet being positioned in fluid communication with at least one coolant plate of the plurality of coolant plates.

Aspect 36: A method of producing a desired product, comprising performing a chemical reaction using the reactor of any one of aspects 27-35.

Aspect 37: The method of aspect 36, wherein the chemical reaction is an exothermic reaction.

Aspect 38: The method of aspect 37, wherein the exothermic reaction is a syngas conversion reaction.

Aspect 39: The method of aspect 36, wherein the chemical reaction is an endothermic reaction.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A reactor for producing a desired product, comprising:
a housing having an outer portion, a central portion, and a longitudinal axis passing through the central portion, the outer portion being radially spaced from the central portion, the housing defining a circumferential coolant inlet channel within the outer portion of the housing; and a circumferential coolant outlet channel within the central portion of the housing, the coolant inlet channel being configured to receive at least one coolant material;
a plurality of coolant plates circumferentially spaced within the housing, wherein each coolant plate of the plurality of coolant plates extends radially between the coolant inlet channel and the coolant outlet channel, wherein each coolant plate defines a plurality of radial coolant channels that extend radially between, and in fluid communication with, the coolant inlet channel and the coolant outlet channel; and
a catalyst bed extending circumferentially within the housing and defined between the coolant inlet channel and the coolant outlet channel, the catalyst bed being configured to receive at least one catalyst,
wherein the housing defines a gas inlet positioned in fluid communication with the catalyst bed, the gas inlet being configured to deliver reactant gas to the catalyst bed,
wherein the housing defines a product collection area in fluid communication with the catalyst bed, wherein the product collection area is configured to receive the desired product following reaction between the gas and the at least one catalyst within the catalyst bed, wherein the product collection area is positioned in communication with first and second product outlets, and
wherein the housing defines a base portion positioned in fluid communication with the product collection area and the first and second product outlets, wherein the base portion of the housing defines the second product outlet.

2. The reactor of claim 1, wherein each coolant plate comprises a plurality of adjoined plate segments, and wherein each plate segment defines a corresponding radial coolant channel.

3. The reactor of claim 2, wherein each respective plate segment of each coolant plate is welded to its adjoining plate segments.

4. The reactor of claim 1, wherein the plurality of coolant plates span radially across the catalyst bed, and wherein the gas inlet is configured to permit radial flow of gas into the catalyst bed.

5. The reactor of claim 1, wherein the plurality of coolant plates are substantially evenly circumferentially spaced within the housing.

6. The reactor of claim 1, further comprising at least one secondary coolant inlet spaced radially inwardly from the coolant inlet channel, each secondary coolant inlet being positioned in fluid communication with at least one coolant plate of the plurality of coolant plates.

7. The reactor of claim 1, wherein the housing has an outer wall, a first circumferential inner wall, a second circumferential inner wall, and a first perforated circumferential wall, the first circumferential inner wall being spaced radially outwardly from the second circumferential inner wall, the perforated circumferential wall being positioned radially between the first circumferential inner wall and the second circumferential inner wall, the outer wall and the first circumferential inner wall cooperating to define the circumferential coolant inlet channel, the second circumferential inner wall defining the circumferential coolant outlet channel, wherein the catalyst bed is defined between the first circumferential inner wall and the first perforated circumferential wall, wherein the perforated circumferential wall of the housing is configured to permit radial passage of the desired product, and wherein the perforated circumferential wall cooperates with the second circumferential inner wall to define the product collection area.

8. The reactor of claim 1, wherein the first product outlet is configured to receive light-weight products from the product collection area, and wherein the second product outlet is configured to receive heavier products from the product collection area.

9. The reactor of claim 1, wherein the housing has an outer wall, a first circumferential inner wall, a second circumferential inner wall, a first perforated circumferential wall, and a second perforated circumferential wall, the first inner wall being radially spaced from the second inner wall, the first perforated circumferential wall being positioned radially between the first circumferential inner wall and the second circumferential inner wall, the second perforated circumferential wall being positioned radially between the first perforated circumferential wall and the second circumferential inner wall, the outer wall and the first circumferential inner wall cooperating to define the coolant inlet channel, the second inner wall defining the coolant outlet channel, wherein the catalyst bed is defined between the first perforated circumferential wall and the second perforated circumferential wall,
wherein the first perforated circumferential wall cooperates with the first circumferential inner wall to define the gas inlet, the gas inlet comprising a channel configured to receive at least one gas, wherein the first perforated circumferential wall is configured to permit radial passage of the at least one gas into the catalyst bed,
wherein the second perforated circumferential wall cooperates with the second circumferential inner wall to define the product collection area, and wherein the second perforated circumferential wall of the housing is configured to permit radial passage of the desired product into the product collection area.

10. The reactor of claim 9, wherein upon delivery of the gas into the gas inlet channel, the catalyst bed is configured to receive the gas from the gas inlet channel, and wherein the plurality of coolant plates are configured to provide cooling to the catalyst bed during the reaction between the gas and the catalyst within the catalyst bed.

11. The reactor of claim 9, wherein the first product outlet is defined by a third inner wall positioned within and radially spaced from the second inner wall of the housing, and wherein the first product outlet extends upwardly from the base portion of the housing.

12. A reactor for producing a desired product, comprising:
a housing having an outer wall, a first circumferential inner wall, a second circumferential inner wall, a perforated circumferential wall, and a longitudinal axis, the first circumferential inner wall being spaced radially outwardly from the second circumferential inner wall, the perforated circumferential wall being positioned radially between the first circumferential inner wall and the second circumferential inner wall, the outer wall and the first circumferential inner wall cooperating to define a coolant inlet channel, the coolant inlet channel being configured to receive at least one coolant material, the second circumferential inner wall defining a coolant outlet channel;
a catalyst bed extending circumferentially within the housing and defined between the first circumferential inner wall and the perforated circumferential wall, the catalyst bed being configured to receive at least one catalyst; and
a plurality of coolant plates, each coolant plate of the plurality of coolant plates spanning radially across the catalyst bed between the coolant inlet channel and the coolant outlet channel, each coolant plate defining a plurality of radial coolant channels positioned in fluid communication with the coolant inlet channel and the coolant outlet channel, wherein the plurality of radial coolant channels within each coolant plate are spaced apart relative to the longitudinal axis of the housing and oriented substantially perpendicular to the longitudinal axis of the housing,
wherein the perforated circumferential wall of the housing is configured to permit radial passage of the desired product, and wherein the perforated circumferential wall cooperates with the second circumferential inner wall to define a product collection area,
wherein the housing defines a gas inlet positioned in fluid communication with the catalyst bed, the gas inlet being configured to deliver reactant gas to the catalyst bed,
wherein the product collection area is configured to receive the desired product following reaction between the gas and the at least one catalyst within the catalyst bed, wherein the product collection area is positioned in communication with first and second product outlets, and
wherein the housing defines a base portion positioned in fluid communication with the product collection area and the first and second product outlets, wherein the base portion of the housing defines the second product outlet.

13. A reactor for producing a desired product, comprising:
a housing having an outer wall, a first circumferential inner wall, a second circumferential inner wall, a first perforated circumferential wall, a second perforated circumferential wall, and a longitudinal axis, the first inner wall being radially spaced from the second inner wall, the first perforated circumferential wall being positioned radially between the first circumferential inner wall and the second circumferential inner wall, the second perforated circumferential wall being positioned radially between the first perforated circumferential wall and the second circumferential inner wall, the outer wall and the first circumferential inner wall cooperating to define a coolant inlet channel, the second inner wall defining a coolant outlet channel, the coolant inlet channel being configured to receive at least one coolant material;
a catalyst bed extending circumferentially within the housing and defined between the first perforated circumferential wall and the second perforated circumferential wall, the catalyst bed being configured to receive at least one catalyst; and
a plurality of coolant plates, each coolant plate of the plurality of coolant plates spanning radially across the catalyst bed between the coolant inlet channel and the coolant outlet channel, each coolant plate defining a plurality of radial coolant channels, wherein the plurality of radial coolant channels within each coolant plate are spaced apart relative to the longitudinal axis of the housing and oriented substantially perpendicular to the longitudinal axis of the housing,
wherein the first perforated circumferential wall cooperates with the first circumferential inner wall to define a gas inlet channel, the gas inlet channel being configured to receive at least one gas, wherein the first perforated circumferential wall is configured to permit radial passage of the at least one gas into the catalyst bed,
wherein the second perforated circumferential wall cooperates with the second circumferential inner wall to define a product collection area, and wherein the second perforated circumferential wall of the housing is configured to permit radial passage of the desired product into the product collection area,
wherein the product collection area is configured to receive the desired product following reaction between the gas and the at least one catalyst within the catalyst bed, wherein the product collection area is positioned in communication with first and second product outlets, and
wherein the housing defines a base portion positioned in fluid communication with the product collection area and the first and second product outlets, wherein the base portion of the housing defines the second product outlet.

\* \* \* \* \*